US006387513B1

(12) United States Patent
Beyrle et al.

(10) Patent No.: US 6,387,513 B1
(45) Date of Patent: May 14, 2002

(54) PROCESS FOR ENAMELLING GLASS SUBSTRATES, ENAMEL COMPOSITION USED AND PRODUCTS OBTAINED

(75) Inventors: André Beyrle, Tracy le Val; Aline DeJean, Thourotte; Daniel Dages, Les Mureaux; Anne-Valentine Veret-Lemarinier, Bievres, all of (FR)

(73) Assignee: Saint Gobain Vitrage, Courbevoie (FR)

( * ) Notice: Subject to any disclaimer, the term of this patent is extended or adjusted under 35 U.S.C. 154(b) by 0 days.

(21) Appl. No.: 09/125,041

(22) PCT Filed: Dec. 2, 1997

(86) PCT No.: PCT/FR97/02181

§ 371 Date: Aug. 11, 1999

§ 102(e) Date: Aug. 11, 1999

(87) PCT Pub. No.: WO98/25864

PCT Pub. Date: Jun. 18, 1998

(30) Foreign Application Priority Data

Dec. 12, 1996 (FR) .............................................. 96 15266

(51) Int. Cl.$^7$ .................................................. I08C 8/14
(52) U.S. Cl. ........................... 428/428; 501/17; 501/19; 501/20; 501/21; 427/164; 427/165; 427/167; 427/396.2; 428/426; 428/427; 428/469; 428/472
(58) Field of Search ............................... 501/17, 19, 20, 501/21; 428/426, 427, 428, 432, 469, 472; 427/164, 165, 167, 376.2

(56) References Cited

U.S. PATENT DOCUMENTS

| 3,561,985 A | | 2/1971 | Hagedorn et al. ............ 106/54 |
|---|---|---|---|
| 3,718,498 A | * | 2/1973 | Denny |
| 3,721,595 A | * | 3/1973 | Tarnopol |
| 3,962,523 A | * | 6/1976 | Robinson |
| 4,156,613 A | * | 5/1979 | Hund et al. .................. 106/306 |
| 4,215,020 A | * | 7/1980 | Wahlers |
| 4,331,768 A | * | 5/1982 | Boyd |
| 4,388,118 A | * | 6/1983 | Eppler ......................... 106/306 |
| 4,501,778 A | * | 2/1985 | Menschner |
| 4,521,250 A | * | 6/1985 | Kuzel |
| 4,618,538 A | | 10/1986 | Emonts et al. .............. 428/428 |
| 4,959,090 A | * | 9/1990 | Reinherz |
| 5,030,503 A | * | 7/1991 | Carter |
| 5,141,798 A | * | 8/1992 | Chaumonot |
| 5,296,413 A | | 3/1994 | Carroll et al. ................ 501/19 |
| 5,302,557 A | | 4/1994 | Carroll et al. ................ 501/19 |
| 5,342,810 A | * | 8/1994 | Merigaud et al. ............. 501/26 |
| 5,346,651 A | * | 9/1994 | Oprosky et al. ............ 252/514 |
| 5,439,852 A | * | 8/1995 | Hormadaly .................. 501/26 |
| 5,616,173 A | * | 4/1997 | Okamoto et al. ........... 106/117 |
| 5,618,764 A | * | 4/1997 | Usui et al. .................... 501/17 |
| 5,939,343 A | * | 8/1999 | Tunker et al. ................ 501/17 |

FOREIGN PATENT DOCUMENTS

| DE | 218 612 A | 2/1985 |
|---|---|---|
| EP | 0 545 166 A | 6/1993 |
| EP | 0 718 248 A | 6/1996 |

* cited by examiner

Primary Examiner—Archene Turner
(74) Attorney, Agent, or Firm—Pennie & Edmonds LLP

(57) ABSTRACT

The present invention relates to a more easily recyclable enamel composition which includes at least one glass frit and includes, as pigment(s), at least one or more manganese compounds, this composition furthermore having a melting temperature below 750° C.

The invention also relates to an enamelling process using this composition, as well as to the enamelled products obtained.

19 Claims, No Drawings

PROCESS FOR ENAMELLING GLASS SUBSTRATES, ENAMEL COMPOSITION USED AND PRODUCTS OBTAINED

BACKGROUND OF THE INVENTION

The present invention relates to the deposition of enamel on a glass substrate, in particular on a glazing. It relates in particular to a novel enamel composition and to a novel process for the manufacture of an enamelled layer on a glass substrate, as well as to the enamelled products obtained.

Enamels are well known in the prior art and are used, in particular, for coating glass substrates, such as window panes, in the motor-vehicle industry or the building industry. They make it possible, inter alia, to form inscriptions or decorative layers, conductive layers, protective layers, in particular layers for protecting against ultraviolet radiation the adhesive layers or adhesive beads intended for fitting the window panes into bodywork openings, masks, in particular masks for concealing current-collecting strips of heater arrays or for concealing the adhesive beads mentioned above, etc.

The enamels used for coating glass substrates are generally formed (before they are applied to the substrate and fired) from a powder which includes a glass frit (which has to form the glassy matrix), and from pigments (in particular as colorants, it being possible for these pigments also to form part of the frit), the frit and the pigments being based on metal oxides, and from a medium or "vehicle" allowing application and temporary adhesion of the enamel to a substrate. The vehicle, chosen depending on the end-use of the enamel, must ensure that the particles of the frits and pigments used are properly in suspension and must be consumed at the latest during firing of the enamel. This vehicle may contain solvents, diluents, oils, resins, etc.

One problem with existing enamelled glass substrates is the difficulty of recycling such products, in particular in the manufacture of glass substrates in the form of sheets (glazings). Since glazings have to satisfy many requirements in terms of coloration, light and/or energy transmission, etc., it is indeed important for glass waste reintroduced in ground form (cullet) into the melting furnaces used for manufacturing glazings not to disturb the usually already present glass compositions and not to give products which do not meet the necessary requirements. Although non-enamelled glass cullet may thus be reintroduced into a furnace for manufacturing float glass, in amounts generally of about 20–30% by weight of the furnace charge, enamelled glass cullet, on the other hand, generally results in the appearance of undesirable residual colorations or non-melted islands in the glass sheets formed. The amount of enamelled glass cullet which can be reintroduced into these furnaces consequently does not exceed, in the most favorable cases, from 2 to 3% by weight of the charge of the furnaces (the enamel generally constituting from 0.1 to 0.5% by weight of this glass cullet).

SUMMARY OF THE INVENTION

The object of the present invention is to provide an improved enamel composition and an enamelling process making it possible to obtain improved enamelled glass substrates (especially glazings), in particular enamelled substrates which can be more easily recycled (in particular in the manufacture of glazings) than the existing enamelled substrates, the enamelled layers obtained furthermore preferably having the usually required characteristics (in particular, in terms of opacity and coloration) for the enamelled layers which have to coat window panes (glazings) for motor vehicles.

This object is achieved by the enamel composition according to the invention, this composition including at least one glass frit and including, as pigment(s), at least one or more manganese compounds, this composition furthermore having a melting temperature below 750° C.

DETAILED DESCRIPTION OF THE INVENTION

In one advantageous embodiment of the invention, the enamel composition furthermore includes less than 10% by weight (with respect to the composition) and, preferably, less than 5% by weight of silver particles.

Particularly preferably, it includes less than 10% and advantageously less than 5% by weight of silver particles and of any other silver-based compound and/or includes less than 10% and advantageously less than 5% by weight of silver particles and of any other conductive particle (i.e., in the latter case, it includes less than 10% and advantageously less than 5% of conductive particles). In particular, the compositions according to the invention containing no silver particles and/or no silver-based compounds and/or no other conductive particles and/or no certain undesirable heavy metals mentioned later (in particular, lead or lead oxides) have many advantages, as will be explained later.

The expression "enamel composition" is understood to mean, according to the invention, the composition of the enamel considered before it is fired, the enamel after it has been fired being essentially in the form of a coloured glassy matrix. The expression "melting temperature of the enamel composition" is understood to mean, according to the invention, the melting temperature of the enamel in its form as deposited on the substrate to be coated. This "melting temperature" is also commonly called "firing temperature" or "fusability temperature". In the field of enamels, it corresponds to the minimum temperature at which "sufficient" sintering of the composition is observed, this "sufficient" sintering being manifested in particular by the disappearance of the capillary effect in the enamel during sintering. Those skilled in the art know how to measure this melting temperature, for example by passing an ink pen (i.e. more specifically a felt-tip pen) over the enamel (after the latter has been raised to a treatment temperature and then cooled) and by noting the lowest treatment temperature for which the trace, left through the cooled enamel by the solvents in the ink when they are absorbed by the enamel due to the capillary effect, disappears. During the production of an enamelled substrate, the temperature chosen for firing the enamel deposited on the substrate is then preferably chosen to be above or equal to its melting temperature. As a general rule, and preferably, the melting temperature of the enamel composition according to the invention is below 700° C.

According to the invention, the enamel composition includes at least one or more manganese compounds (this is generally a single compound, but it may also be a mixture of various manganese compounds) as pigment(s). Preferably it includes the said manganese compound(s) as the main pigment(s), that is to say that the enamel composition may optionally include one or more other pigments but that, in this case, the amount of each other optional pigment remains less than the amount of manganese compound(s). Particularly advantageously (in particular, for reasons associated with recycling), the manganese compound(s) represents (represent) at least 50% by weight of the pigments present, preferably at least 75% by weight of the pigments present, and is (are) particularly preferably the only pigment(s) used in the composition according to the invention. In particular, the enamel composition according to the invention advantageously contains no chromium oxides, no copper oxides, no cobalt oxides or nickel oxides and also contains no other colorant compounds, such as copper chromates, cobalt chromates, etc. and/or no other colorant oxides, such as iron oxides, etc.

The manganese compound(s) is (are) preferably added in the form of manganese salt (or salts) and/or of manganese oxide(s) (for example, $MnO_2$ and/or $Mn_2O_3$ and/or $Mn_3O_4$ and/or MnO) to the enamel composition according to the invention, particularly preferably in the form of manganese carbonate(s) and/or $MnO_2$. Depending on the way in which the enamel composition is prepared, it (they) may also be provided or occur in another form (or other forms) in the composition (in particular, in the form of other manganese derivatives). As a general rule, it (they) gives (give) one or more manganese oxides (preferably, $Mn_3O_4$ optionally accompanied by $Mn_2O_3$, or even MnO) at the latest while the enamel on the coated substrate is being fired. It is generally advantageous, in particular if the manganese compound(s) used is (are) not already in crystallized form, to treat the manganese compound(s) so as to obtain a structural rearrangement, for example of the crystallization type, within this compound (or these compounds), for example by subjecting the enamel according to the invention to a heat treatment (it being sometimes possible for the rearrangement to occur while the enamel is being fired, but it generally being caused by an independent heat treatment prior to firing), this rearrangement promoting the formation of enamel layers having improved properties, in particular in terms of opacity, coloration and/or anti-adhesive properties.

The amount of pigment(s) (advantageously of the manganese compound (or compounds)) in the frit(s)/pigment(s) combination of the composition according to the invention is generally between 10 and 50% by weight, preferably between 15 and 40% by weight and particularly preferably between 20 and 35% by weight (with respect to the frit(s) and pigment(s) combination), in particular for reasons of opacity and of integrity of the enamel layer.

The glass frit according to the invention is a vitrifiable mixture which includes oxides chosen in particular from the oxides commonly employed in enamel frits, for example chosen from silicon oxides, zinc oxides, bismuth oxides, sodium oxides, boron oxides, lithium oxides, potassium oxides, calcium oxides, aluminum oxides, magnesium oxides, etc., or from barium oxides, strontium oxides, antimony oxides, etc. Preferably (in particular, for reasons associated with recycling), the glass frit is a frit which includes less than 1% (advantageously less than 0.1% and particularly advantageously less than 0.05%) by weight of lead oxides and, particularly preferably, is a frit containing no lead oxides. It also preferably contains no other undesirable elements, such as cadmium oxides, fluorine, etc.

Particularly advantageously, this is a frit which includes $SiO_2$ as network-forming oxide. Also preferably, it includes $Bi_2O_3$ and/or ZnO as intermediate oxide(s) (particularly preferably as the main intermediate oxide(s)).

The terms "network-forming oxide", "network-modifying oxide" and "intermediate oxide" are terms well known to those skilled in the art of glassmaking. The network-forming oxides are oxides such as silica $SiO_2$, $B_2O_3$, etc., these forming the essential components of the glassy network; the network-modifying oxides are oxides such as CaO, $K_2O$, $Na_2O$, BaO, etc., these being capable of modifying the glassy network and of influencing properties such as the viscosity or the melting point; the intermediate oxides are oxides such as $Al_2O_3$, PbO, ZnO, $Bi_2O_3$; these acting, depending on their environment and the proportion in which they are present, as network-forming oxide and/or as network-modifying oxide.

The enamel composition according to the invention may include several glass frits mixed together and having different properties (in particular, different melting temperatures). According to a preferred embodiment, the enamel composition according to the invention includes, as the frit(s) (the pigments not being taken into consideration), the mixture of the following components in the proportions expressed in percentages by weight (with respect to this mixture):

| | |
|---|---|
| $Bi_2O_3$ | 50–70% |
| $SiO_2$ | 15–30% |
| $B_2O_3$ | 1–13% |
| $Na_2O$ | 0.5–7% |
| $Al_2O_3$ | 0.5–7% |
| $B_2O_3 + Na_2O + Al_2O_3$ | 7.5–18%. | with, preferably,

This composition makes it possible to obtain a particularly useful enamel which has, in particular, very good recyclability.

The enamel composition according to the invention may also include a vehicle making it possible to obtain the desired viscosity for applying the enamel to the substrate and allowing it to bond to the substrate. This vehicle may be any vehicle normally used in conventional enamel compositions and may, in particular, contain solvents, diluents, oils such as pine oils and other plant-based oils, resins such as acrylic resins, petroleum fractions, film-forming materials such as cellulosic materials, etc. The proportion of vehicle in the ready-to-be-deposited composition is preferably between 15 and 40% by weight of the said composition.

The enamel obtained after firing has good opacity allowing, in particular, its use as a mask (for example, for protecting adhesive beads in motor vehicles). The enamel is considered to have good opacity if it has an optical density of at least 2.8 and preferably at least 3. The optical density (OD) is measured using a densitometer, for example the GRETAG® D200 apparatus (in which a 550 nm filter is used) and is related to the light transmission factor $T_L$ through the relationship:

$$OD = \log 1/T_L$$

Moreover, whatever the initial color (before firing) of the enamel composition according to the invention, it generally gives, after firing (at temperatures generally lying between 550 and 750° C.), an enamel whose color is appropriate for motor-vehicle applications. Preferably, the enamel composition according to the invention is chosen so as to give, after firing, a black enamel (this is generally the case with compositions according to the invention which include manganese salt (or salts), in particular manganese carbonate and/or manganese oxide (or oxides) such as $MnO_2$, $Mn_2O_3$ and/or $Mn_3O_4$, and/or with compositions according to the invention containing none of the aforementioned undesirable compounds, and/or which include the abovementioned frit in the indicated percentages by weight, etc.) particularly sought-after in such applications. The expression "black enamel" is understood to mean hereafter an enamel having a black color after firing.

Particularly preferably, the enamel composition according to the invention is chosen so as to obtain a black enamel having the following colorimetric coordinates, in absolute values:

$L^* \leq 5$; $|a^*| \leq 2$ and $|b^*| \leq 2$ (and, preferably, $|a^*| \leq 1$ and $|b^*| \leq 1$).

The colorimetric coordinates L*, a* and b* were defined and proposed in 1931 by the International Commission on Illumination [Commission Internationale de l'Eclairage (CIE)] and have formed the subject of a CIE official recommendation in 1976 (Commission Internationale de l'Eclairage, Colorimetry—Recommandations Officielles—Publication CIE No. 151-2, Vienne, 1986). The calorimetric coordinates indicated above are measured in reflection, on a Minolta CM 2002 spectrocolorimeter, under D65 illuminant, for enamel which is on a non-tinted glass substrate having a light transmission factor of approximately 90% and a thickness of 4 mm.

Substrates coated with the enamel according to the invention also have superior recyclability because of the use of the manganese compound or compounds as all or some of the pigments. Thus, when the substrates coated with the enamel having the composition according to the invention are reintroduced, in cullet form, into a furnace for melting the batch materials for the production of glass sheets (at temperatures generally about 1350 to 1500° C.), the coloration of the enamel generally disappears and does not interfere with the coloration of the glass resulting from the batch materials used. The recyclability of the composition according to the invention and its opacity and colour characteristics are particularly improved when the enamel composition includes less than 10% of silver particles or less than 10% of silver particles and any other silver-based compound, or less than 10% of conductive particles, as indicated previously, in particular when the composition contains none of the said silver particles and/or none of the said conductive particles and/or none of the said silver-based compounds (as silver may, in particular, cause problems when recycling and give the enamel a not very desirable chestnut-brown coloration). In the same way, the recyclability and/or the opacity and color characteristics of the enamel and/or possibly the mechanical properties of the enamelled glasses are further improved when the composition includes less than 1% of or does not contain one or more of the aforementioned undesirable components (such as lead, chromium, copper, cobalt, nickel, iron, cadmium, or compounds, for example metal oxides, containing at least one of these metals).

Apart from the advantages associated with recycling and with the satisfactory properties obtained in terms of opacity and coloration, it may be pointed out that the enamel composition according to the invention is also easy to employ and is more economic because of the use of the manganese compound(s), these compounds being less expensive than the compounds normally used as pigments in enamel compositions. Since the pigments represent from 10 to 50% by weight of the frit(s)/pigment(s) combination, the cost saving may be particularly great.

The enamel composition according to the invention may be obtained by adding, in particular, the manganese compound(s) (and optionally the other pigment or pigments) in the form of powder(s) to a powder of glass frit(s) (this frit or these frits possibly being already in suspension in a vehicle).

In this case, the particle size of the frit(s)/pigment(s) combination in powder form is preferably chosen so that at least 90% by weight of the particles forming the powder have a diameter of less than 40 $\mu$m and particularly preferably less than 20 $\mu$m, the choice of such a particle size enabling the opacity of the enamel obtained after firing to be further improved.

The frit(s)/pigment(s) combination of the composition according to the invention may also be obtained using the following process (called hereafter the "direct process"): a mixture of raw materials suitable for obtaining the desired frit(s)/pigment(s) combination (for example, a mixture of bismuth oxide, silica, boric acid and/or borax, sodium carbonate and/or sodium nitrate, alumina, and manganese carbonate and/or $MnO_2$, when it is desired to obtain a frit(s)/pigment(s) combination which includes the frit with the composition expressed hereinabove in percentages by weight and including $MnO_2$ by way of pigment) is melted at temperatures of approximately 1000 to 1300° C., this melting preferably being followed by a treatment, such as annealing, at temperatures below about 480–500° C. in order to obtain a structural rearrangement within the mixture (in particular within the pigment(s)) and, possibly, to develop crystallization seeds. Next, the mixture is ground up in order to give a frit(s)/pigment(s) combination in the form of a powder. Preferably, the grinding carried out is a fine grinding so that at least 90% by weight of the particles forming the powder obtained have a diameter of less than 40 $\mu$m, preferably less than 20 $\mu$m and particularly less than 10 $\mu$m (this fine grinding making it possible to obtain better results in terms of opacity of the enamel). Next, the powder is optionally heat treated, generally between 400 and 600° C., so as to stabilize the mixture and to reinforce the coloration of the enamel obtained from this powder (for example, to give it a "blacker" coloration).

The direct process is particularly advantageous; in particular, it is more simple, rapid and economical than the conventional processes for producing enamel compositions. In general, it makes it possible to obtain enamels having a blacker coloration than those obtained by mixing a powder of glass frit(s) and a powder of manganese compound (or compounds), in particular it generally makes it possible to obtain enamels having the aforementioned colorimetric coordinates (i.e.: $L^* \leq 5$; $|a^*| \leq 2$ and $|b^*| \leq 2$).

The frit(s)/pigment(s) combination of the composition is generally put in suspension in a vehicle so as to obtain a composition capable of being deposited on a substrate. According to the enamelling process of the invention, at least part of a glass substrate is coated with an enamel composition according to the invention and the enamelled substrate is subjected to a heat treatment so as to fire the enamel and, where appropriate, so as to develop crystallization seeds or to obtain structural rearrangement within the pigments.

The substrate on which the enamel composition is deposited may be a bare glass substrate or a glass substrate already coated with one or more layers of enamel, preferably with one or more layers of enamel according to the invention. This substrate may consist of one or more glass sheets and may be toughened so as to have improved mechanical strength and thermal resistance properties. The substrate coated with enamel according to the invention thus includes at least one glass sheet coated on at least part of one of its sides with at least one layer of an enamel having a composition according to the invention. The enamel according to the invention may also be used to coat other types of substrate.

In the process for enamelling glass substrates, in particular glazings, according to the invention, the enamel composition is preferably deposited on the substrate by screen printing and then fired, the firing taking place, where appropriate, during the heat treatment associated with the bending and/or toughening of the substrates, the firing temperatures generally being approximately 550 to 750–800° C. In this regard, it may be observed that the enamel according to the invention may advantageously be implemented with the aid of the devices and under the temperature and pressure conditions which are normally used for implementing conventional enamels, in particular in motor-vehicle applications.

The deposition of the enamel composition may also be carried out by spraying, by curtain coating or roller coating, etc., the deposition generally being followed by a drying step, for example using infrared, in order temporarily to fix the enamel, for example by removing the diluents from the vehicle serving for applying the enamel to the substrate. If several layers are deposited on the substrate, each layer is preferably dried before the next one is deposited, firing being carried out on all the layers.

The optional bending and toughening of the glass substrates are carried out using known methods. In particular, the bending may be carried out under gravity (in particular the bending of glass substrates in pairs for the purpose of producing laminated glasses) or with the aid of dies and, when the substrates are bent and toughened, the toughening operation may be carried out after the enamelled substrates have been bent, optionally within the same device.

If glass substrates have to undergo simultaneous bending for the purpose of producing panes of laminated glass, the enamel is deposited on at least one of the substrates and the substrates are joined together and then bent, the glass substrates being subsequently separated in order to insert at least one interlayer film of different material, and then the pane of laminated glass is obtained by joining together all these components with the application of heat and pressure.

It should be pointed out that some enamel compositions according to the invention have anti-adhesive (anti-stick) properties, these compositions not adhering to the other glass sheets or to the dies which come into contact with them during the bending operations.

The glass substrates, in particular glazings, coated with enamel according to the invention have improved recyclability, these substrates generally being recyclable, especially in the form of cullet in furnaces for manufacturing glass sheets, in particular in the furnaces, which are most widely used, for the manufacture of glass sheets using the float process, or "floats", in amounts which may be as much as 15%, or even at least 50% by weight of the charge of the furnaces (the enamel generally constituting from 0.1 to 0.5% by weight of the glass cullet). The substrates coated with enamel according to the invention furthermore have mechanical properties which are sufficient for their use in motor-vehicle applications.

Other advantages and characteristics of the invention will emerge from the following examples which illustrate the present invention without, however, limiting it.

EXAMPLE 1

According to this example, the enamel composition is produced as follows: 100 parts by weight of a frit (in the form of powder), containing 11% by weight of $B_2O_3$, 65% by weight of $BiO_3$, 17.4% by weight of $SiO_2$, 2.6% of $Na_2O$ and 4% of $Al_2O_3$, are mixed with 43 parts by weight of manganese carbonate (in the form of powder) and then this mixture is put into suspension in 27 parts by weight of a pine-oil-based vehicle which includes 3% by weight of acrylic resin, so as to obtain an enamel composition ready to be deposited on a substrate.

The composition is deposited on a glass sheet 4 mm in thickness and then fired between approximately 620 and 750° C. A substrate coated with a layer of black enamel having an optical density of 3 is obtained; such substrate can also be toughened.

Next, the substrate is ground up and introduced into a furnace for melting batch materials for production of glass sheets using the float process, the substrate representing 50% by weight of the charge of the furnace (and the enamel representing 0.5% by weight of this substrate). The temperature of the furnace is between 1250 and 1500° C. The following was observed decoloration of the enamel and absence of batch stones on leaving the furnace.

EXAMPLE 2

An enamel composition is produced by using 143 parts of a frit/pigments combination obtained by melting at approximately 1200° C. sodium carbonate, alumina, boric acid, silica, bismuth oxide and $MnO_2$ (or manganese carbonate) followed by annealing at approximately 450° C. (this mixture, as it is, therefore undergoing a structural rearrangement) and by grinding. The combination obtained has the following composition by weight 7.7% $B_2O_3$, 45.5% $Bi_2O_3$, 12.2% $SiO_2$, 1.8% $Na_2O$, 2.8% $Al_2O_3$ and 30% $MnO_2$; this combination is added to 27 parts of the vehicle used in Example 1 and then the enamel composition thus obtained is deposited on a glass sheet and treated as in Example 1.

A substrate coated with a black enamel layer (this layer being blacker than the one obtained in Example 1) is obtained which has an optical density of 3.9 and the following colorimetric coordinates: $L^*=2.7$; $a^*=-0.9$ and $b^*=0.3$. Next, the substrate is ground up and introduced into a melting furnace as in Example 1. The same results as in Example 1 are observed (i.e., decoloration of the enamel and absence of batch stones on leaving the furnace).

Comparative Example

The same procedure as in Example 1 is carried out, but with a conventional pigment, copper chromate, replacing the manganese carbonate. The enamel obtained after firing is black. However, after the cullet of glass coated with this enamel is treated between 1250 and 1500° C. in a furnace for melting the batch materials for the production of glass sheets using the float process, a residual green coloration is, in particular, observed on the glass sheets leaving the furnace. Contamination of the furnace is also observed, this being associated with the presence of copper due to the reduction of the oxides. The enamel according to the present example is also more expensive (about 30% more expensive) than the enamel according to Example 1 and the enamel according to Example 2.

The enamels according to the invention may, in particular, be used for coating glazings for the motor-vehicle industry or for buildings.

What is claimed is:

1. An enamel for a glass substrate comprising at least one glass frit including less than 1% by weight of lead oxides, one or more manganese compounds as the main pigment(s), less than 10% by weight of silver particles, and having a melting temperature below 750° C.

2. Composition according to claim 1, characterized in that the manganese compound(s) is (are) provided in the form of manganese salt(s) and/or of manganese oxide(s).

3. Composition according to claim 1, characterized in that the amount of pigment(s) is between 10 and 50% by weight of the frit(s) and pigment(s) combination.

4. Composition according to claim 1, characterized in that it includes less than 0.1% of lead oxides.

5. Composition according to claim 1 characterized in that the glass frit includes $SiO_2$ as a network-forming oxide.

6. Composition according to claim 1, characterized in that the glass frit includes $Bi_2O_3$ and/or ZnO as intermediate oxide(s).

7. Composition according to claim 1, characterized in that it includes, as frit(s), the mixture of the following components in the proportions expressed in percentages by weight:

| | |
|---|---|
| $Bi_2O_3$ | 50–70% |
| $SiO_2$ | 15–30% |
| $B_2O_3$ | 1–13% |
| $Na_2O$ | 0.5–7% |
| $Al_2O_3$ | 0.5–7%. |

8. Composition according to claim 1, characterized in that it furthermore includes a vehicle.

9. Process for manufacturing an enamel composition according to claim 1, in which the raw materials are melted at temperatures of approximately 1000 to 1300° C., this melting optionally being followed by an annealing treatment and the mixture obtained them being ground up in order to give the frit(s)/pigment(s) combination of the enamel composition.

10. Glazing including at least one glass sheet coated, on at least part of at least one of its sides, with at least one layer of an enamel having a composition according to claim 1.

11. Glazing according to claim 10, characterized in that it is coated with a black enamel having the following colormetric coordinates, in absolute values: $L^* \leq 5$; $|a^*| \leq 2$ and $|b^*| \leq 2$, these coordinates being measured for the enamel when on a glass substrate having a light transmission factor of approximately 90% and a thickness of 4 mm.

12. The enamel composition of claim 1 wherein the melting temperature is below 700° C.

13. The enamel composition of claim 1 characterized in that the enamel composition contains less than 10% of conductive particles, and wherein the manganese compounds comprise at least about 75% of the pigment(s).

14. The enamel composition of claim 1 characterized in that the enamel composition contains less than 5% of silver in the form of silver or silver-containing compounds.

15. The enamel of claim 3 characterized in that the amount of pigment(s) is between 20% and 35% by weight of the frit(s) and the pigment(s) combined.

16. The enamel of claim 3 wherein the quantity of lead-, chromium-, copper-, cobalt-, iron-, nickel-, and/or cadmium-containing compounds is less than about 1% of each.

17. The enamel composition of claim 1, wherein the manganese compound(s) are present in an amount of at least 50% by weight of the pigment(s).

18. Process for enamelling a glass substrate, in which at least a part of a glass substrate is coated with an enamel composition which includes at least one glass frit including less than 1% by weight of lead oxides, one or more manganese compounds as the main pigment(s), less than 10% by weight of silver particles, and having a melting temperature below 750° C., and then the enamelled substrate is subjected to a heat treatment so as to fire the enamel.

19. The process of claim 18 further comprising manufacturing glass substrate, wherein the enamelled substrates is recycled in ground form into the melting furnace in an amount greater than 15% by weight of the total charge and wherein the temperature of the furnace reaches between about 1350° C. and 1500° C., wherein the enamel constitutes between 0.1 to 0.5% by weight of the substrate.

\* \* \* \* \*

UNITED STATES PATENT AND TRADEMARK OFFICE
CERTIFICATE OF CORRECTION

PATENT NO. : 6,387,513 B1
DATED : May 14, 2002
INVENTOR(S) : Beyrle et al.

It is certified that error appears in the above-identified patent and that said Letters Patent is hereby corrected as shown below:

Column 8,
Line 57, insert the word -- composition -- between the words "enamel" and "for".

Column 9,
Line 24, insert a -- , -- after the word "treatment".
Line 25, replace "them" with -- then --.

Column 10,
Line 14, delete "of" after "1%".

Signed and Sealed this

Seventeenth Day of September, 2002

Attest:

JAMES E. ROGAN
Attesting Officer
Director of the United States Patent and Trademark Office

UNITED STATES PATENT AND TRADEMARK OFFICE
CERTIFICATE OF CORRECTION

| | | |
|---|---|---|
| PATENT NO. | : 6,387,513 B1 | Page 1 of 1 |
| DATED | : May 14, 2002 | |
| INVENTOR(S) | : Andre Beyrle, Aline DeJean, Daniel Dages and Anne-Valentine Veret-Lemarinier | |

It is certified that error appears in the above-identified patent and that said Letters Patent is hereby corrected as shown below:

<u>Column 4,</u>
Line 23, replace "$B_2O_3 + Na_2O + Al_2O_3 \quad$ 7.5 to 18% with
-- with, preferably, $B_2O_3 + Na_2O + Al_2O_3 \quad$ 7.5 to 18% --.
Line 25, delete "with, preferably,".

<u>Column 7,</u>
Line 61, replace "$BiO_3$" with -- $Bi_2O_3$ --.

Signed and Sealed this

Seventh Day of January, 2003

JAMES E. ROGAN
*Director of the United States Patent and Trademark Office*